(12) United States Patent
Engelhardt et al.

(10) Patent No.: US 6,900,935 B2
(45) Date of Patent: May 31, 2005

(54) OPTICAL ARRANGEMENT AND MICROSCOPE

(75) Inventors: Johann Engelhardt, Bad Schoenborn (DE); Juergen Hoffmann, Wiesbaden (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 115 days.

(21) Appl. No.: 09/906,435

(22) Filed: Jul. 16, 2001

(65) Prior Publication Data

US 2002/0030885 A1 Mar. 14, 2002

(30) Foreign Application Priority Data

Jul. 20, 2000 (DE) .......................... 100 35 688

(51) Int. Cl.⁷ ............................................ G02B 21/06
(52) U.S. Cl. .................................... 359/386; 385/33
(58) Field of Search ........................ 359/386, 368, 359/371, 385; 385/33, 147

(56) References Cited

U.S. PATENT DOCUMENTS

| | | | |
|---|---|---|---|
| 5,136,599 A | * 8/1992 | Wilcox ........................ 372/26 |
| 5,161,053 A | 11/1992 | Dabbs ........................ 359/384 |
| 5,168,157 A | * 12/1992 | Kimura ...................... 250/234 |
| 5,212,753 A | * 5/1993 | Maranto ...................... 385/80 |
| 5,835,262 A | * 11/1998 | Iketaki et al. ............... 359/352 |
| 5,887,009 A | * 3/1999 | Mandella et al. .............. 372/6 |
| 5,903,688 A | * 5/1999 | Engelhardt et al. ........... 385/31 |
| 5,969,517 A | * 10/1999 | Rao ............................ 324/96 |
| 6,081,499 A | * 6/2000 | Berger et al. ........... 369/112.27 |
| 6,151,127 A | * 11/2000 | Kempe ........................ 356/484 |
| 6,236,779 B1 | * 5/2001 | Kafka et al. .................. 385/31 |

* cited by examiner

Primary Examiner—Mark A. Robinson
(74) Attorney, Agent, or Firm—Simpson & Simpson, PLLC

(57) ABSTRACT

An optical arrangement, in particular a microscope, having a light source (1) for illuminating an object, and a glass fiber (3), arranged between the light source (1) and the object, for transporting light along a prescribable distance between the light source (1) and the object, is configured with regard to the avoidance of fluctuations in the illuminating light power without a handicap in the optical adjustment of the arrangement in such a way that the glass fiber (3) is a polarizing glass fiber (3).

8 Claims, 1 Drawing Sheet

Fig. :
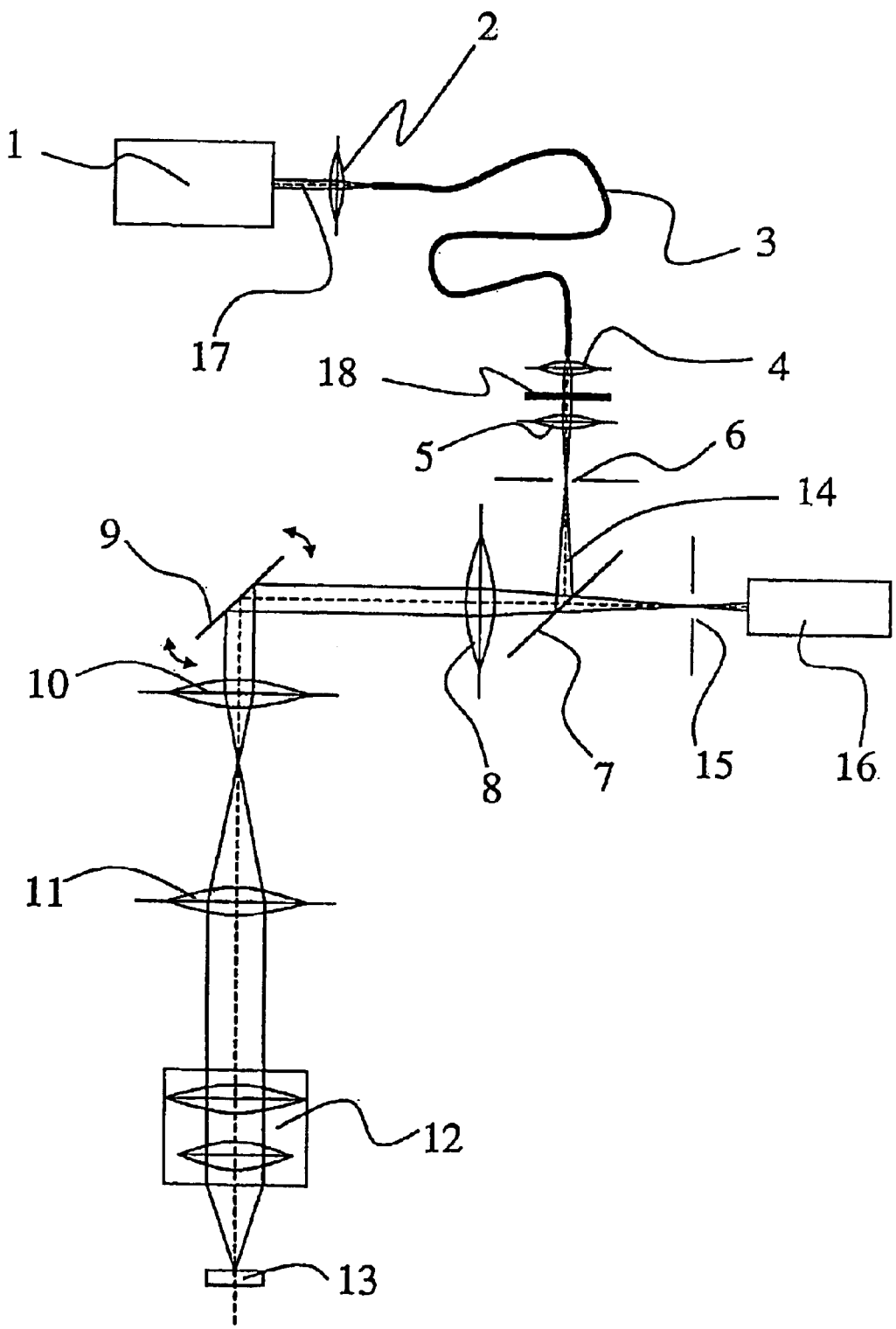

OPTICAL ARRANGEMENT AND MICROSCOPE

CROSS REFERENCE TO RELATED APPLICATIONS

This invention claims priority of the German patent application 100 35 688.5 filed Jul. 20, 2000 which is incorporated by reference herein.

FIELD OF THE INVENTION

The present invention relates to an optical arrangement and relates as well to a microscope.

BACKGROUND OF THE INVENTION

Optical arrangements of the type mentioned at the beginning are known from practice and exist, in particular, in the form of microscopes. Such microscopes can be formed by confocal scanning microscopes. In scanning microscopy, a specimen or an object is scanned with the aid of an illuminating light beam. Use is freely made, for this purpose, of lasers as light source. The illuminating light from the laser is frequently transported to the microscope optics with the aid of glass fibres. The illuminating light generated by the laser is almost always linearly polarized, since usually at least one Brewster window is arranged in a laser resonator. In semiconductor lasers, the electron transition takes place only perpendicular to the p-n interface, and so linearly polarized light results here as well.

Particularly in confocal scanning microscopy, a specimen or an object is scanned in three dimensions with the aid of the focus of the illuminating light beam. A confocal scanning microscope generally comprises a light source, a focusing optics, with the aid of which the light from the light source is focused onto a pinhole stop—the so-called excitation stop—the beam splitter, a scanning device for beam control, a microscope optics, a detection stop and the detectors for identifying the detection light or fluorescent light. Illuminating light is mostly launched via a main beam splitter. The fluorescent light or reflected light coming from the specimen or the object passes via the same scanning device or the same scanning mirror back to the beam splitter or main beam splitter and passes this, thereupon being focused onto the detection stop downstream of which the detectors, mostly photomultipliers, are located. Detection light, which does not originate directly from the focus region, takes a different light path and does not pass the detection stop, and so point information is obtained which leads to a three-dimensional image through sequential scanning of the specimen or the object. A three-dimensional image is mostly obtained by layerwise acquisition of image data.

U.S. Pat. No. 5,161,053 discloses a confocal microscope in which light from an external light source is transported with the aid of a glass fibre to the beam path of the microscope, and the end of the glass fibre serves as point light source such that a mechanical stop is superfluous.

The reflectivity or transimissivity of beam splitters, and the reflectance of scanning mirrors is generally a function of polarization. Even high-quality beam splitters cannot be completely optimized with regard to independence of polarization, and so differences always occur in the reflection response and transmission response with reference to s-polarization and p-polarization. When the direction of linear polarization of the illuminating light beam fluctuates, something which frequently occurs particularly when light is launched with the aid of a glass fibre, this results in disturbing fluctuations in illuminating light at the specimen or the object, and thus also in fluctuations in the detection light. The fluctuations or rotations in the linear polarization in a monomode glass fibre are to be ascribed to mechanical movement of the fibre which cause stress-induced birefringence.

This problem can be eliminated with aid of polarization-maintaining fibres, a new set of problems arising to the effect that the linear polarization of the laser light during launching into the fibre must be correctly orientated relative to the preferred fibre axis. Relative movement between laser and fibre therefore also lead to changes in the transmission through the fibre, something which complicates the optical adjustment, inter alia.

SUMMARY OF THE INVENTION

It is therefore the object of the present invention to specify an optical arrangement in which fluctuations in the illuminating light power are avoided as far as possible in a simple way without a handicap in the optical adjustment of the arrangement.

According to the invention, the above object is achieved by means of an optical arrangement which comprises: a light source, an object arranged in order to be illuminated by the light source, and at least one glass fibre, being provided between the light source and the object, wherein the glass fibre is a polarizing glass fibre and the polarizing glass fibre transports light along a specific distance between the light source and the object.

It is a further object of the invention to provide a microscope in which fluctuations in the illuminating light power are avoided in a simple way.

According to the invention, the above object is achieved by a microscope which comprises: a light source, an objective for illuminating an object, at least one glass fibre being arranged between the light source and the objective wherein the glass fibre is a polarizing glass fibre and transports light along a specific distance between the at least one light source and the objective.

Accordingly, the optical arrangement of the type mentioned at the beginning is configured and developed in such a way that the glass fibre is a polarizing glass fibre.

It has been found in the approach according to the invention that the use of a polarizing glass fibre as glass fibre achieves the above object in a surprisingly simple way. Given such a polarizing glass fibre, the polarization of the light emerging from the glass fibre is determined only by the orientation of the preferred fibre axis, and is largely independent of the polarization and the direction of polarization of the light from the light source. In other words, the orientation of the preferred fibre axis enables the polarization of the light to be set downstream of the glass fibre and upstream of the object. Fluctuations in the illuminating light power because of fluctuations in polarization are thereby avoided as far as possible. Moreover, a handicap in the optical adjustment of the optical arrangement, such as occurs when use is made of polarization-maintaining fibres, is likewise avoided.

Consequently, the optical arrangement according to the invention provides an optical arrangement in which fluctuations in the illuminating light power are avoided as far as possible in a simple way without a handicap in the optical adjustment of the arrangement.

In the optical arrangement, the object can be understood, firstly, as a specimen to be investigated and, secondly, as an object to be illuminated or a system to be illuminated such as, for example, the optics of a microscope.

In a concrete optical arrangement, a plurality of light sources could be provided for illuminating the object, in which case the light from the individual light sources could differ spectrally. It is thereby possible to achieve wide-ranging versatility in a microscope for example.

Given the presence of a plurality of light sources, it would also be possible to provide a plurality of polarizing glass fibres between the light sources and the object. Each light source could be assigned a polarizing glass fibre in this case. A reliable transportation of the illuminating light from the light sources to the object is thereby made possible without fluctuations in the illuminating light power.

In order to set the direction of polarization of the light, a polarization-rotating device could be arranged downstream of the glass fibre or the glass fibres in the illuminating beam direction. The direction of polarization of the light emerging from the glass fibre or the glass fibres can thereby be matched reliably to the object.

In a way which is particularly simple in terms of design, the polarization-rotating device could be a $\lambda/2$ plate. In this arrangement, the $\lambda/2$ plate could be arranged in a rotatable mount with regard to reliably setting the direction of polarization of the light. In concrete terms, the rotatable mount could enable rotation of the $\lambda/2$ plate about the glass fibre axis.

As an alternative, or in addition to this, the polarization-rotating device could have means for rotating the glass fibre end or the glass fibre ends. The glass fibre or the glass fibre end itself could thereby be rotated mechanically in order to match the direction of polarization of the light to the object.

In a particularly convenient way, the means could have a rotating mount so as to enable reliable rotation of the glass fibre end or the glass fibre ends.

In concrete terms, the rotating mount could in this case enable rotation about the glass fibre axis.

It would be possible, for example, with the aid of the polarization-rotating device to set the direction of polarization of the illuminating light before launching the latter into a microscope optic. In particular, the glass fibre or the glass fibres could thereby be arranged between the light source or the light sources and a beam splitter which could serve to launch the illuminating light beam.

Lasers, in particular, are suitable as light source or light sources.

The stability of the optical arrangement according to the invention with regard to fluctuations in the power of the illuminating light and/or detection light is greatly increased by comparison with known arrangements. Furthermore, the outlay on adjustment is reduced.

BRIEF DESCRIPTION OF THE DRAWINGS

There are various possibilities of configuring and developing the teaching of the present invention in an advantageous way. In conjunction with the explanation of the preferred exemplary embodiment of the invention with the aid of the drawing, preferred configurations and developments of the teaching are also explained in general. In the drawing, the sole FIG. 1 shows a diagrammatic illustration of an exemplary embodiment of an optical arrangement according to the invention.

DETAILED DESCRIPTION OF THE INVENTION

The FIGURE shows a diagrammatic illustration of an exemplary embodiment of an optical arrangement according to the invention in the form of a confocal laser scanning microscope. The light source 1 serves to illuminate an object in the form of a specimen 13. Arranged between the light source 1 and the object is a glass fibre 3 for transporting light between the light source 1 and the object. With regard to avoiding fluctuations in the illuminating light power without a handicap in the optical adjustment of the arrangement, the glass fibre 3 is designed as a polarizing glass fibre 3. Arranged between the light source 1 and the glass fibre 3 is a launching optics 2 for the primary excitation or laser light 17. The laser light 17 is reliably launched into the polarizing glass fibre 3 as a result.

An output optics 4 is arranged in the beam path downstream of the glass fibre 3. A $\lambda/2$ plate 18 for rotating the polarization adjoins the output optics 4.

The light subsequently traverses a lens 5 and an illuminating stop 6. The light then passes as a coherence-free illuminating light beam 14 to a beam splitter 7 which reflects the illuminating light beam 14 towards a lens 8.

Adjoining the lens 8 is a movable scanning mirror 9 with the aid of which the illuminating light beam 14 can be scanned over the specimen 13. Lenses 10 and 11 adjoin the scanning mirror 9. Finally, the illuminating light beam 14 reaches the specimen 13 through an objective 12.

A detection stop 15 is provided with a detector 16 adjoining the detection stop 15 in order to identify the detection light or fluorescent light.

The polarization of the illuminating light beam 14 arriving at the beam splitter 7 is determined only by the orientation of the preferred fibre axis, and is largely independent of the polarization and the direction of polarization of the light from the light source 1.

In order to avoid repetitions, reference may be made to the general part of the description and to the attached patent claims with regard to further advantageous refinements of the optical arrangement according to the invention.

Finally, it may be expressly pointed out that the above-described exemplary embodiment of the optical arrangement according to the invention merely serves to discuss the claimed teaching, but does not limit the latter to the exemplary embodiment.

| PARTS LIST | |
|---|---|
| 1 | Light source |
| 2 | Launching optics |
| 3 | Glass fibre |
| 4 | Output optics |
| 5 | Lens |
| 6 | Illuminating stop |
| 7 | Beam splitter |
| 8 | Lens |
| 9 | Scanning mirror |
| 10 | Lens |
| 11 | Lens |
| 12 | Objective |
| 13 | Specimen |
| 14 | Coherence-free illuminating light beam |
| 15 | Detection stop |
| 16 | Detector |
| 17 | Primary laser light |
| 18 | $\lambda/2$ plate for rotation of polarization |

What is claimed is:

1. A scanning microscope assembly for scanning an object, comprising:

a light source operatively arranged to create an illuminating light beam, a launching optic operatively arranged for primary excitation of said illuminating light beam;

a polarizing glass fibre operatively arranged for transporting said illuminating light beam to said object without fluctuations in illuminating light power;

an output optic operatively arranged to condition said illuminating light beam for subsequent transmission through a polarization-rotating device;

said polarization-rotating device operatively arranged to introduce a fixed polarization rotation to said illuminating light beam;

a lens operatively arranged to focus said illuminating light beam;

an illuminating stop operatively arranged to create a coherence-free illuminating light;

a beam splitter operatively arranged to receive said coherence-free illuminating light and redirect said coherence-free illuminating light and permit transmission of a detecting light;

a scanning mirror operatively arranged to sweep said object with said coherence-free illuminating light, and to redirect said detecting light;

a plurality of optics arranged to transmit said coherence-free illuminating light to said object and to receive said detecting light;

a detecting stop operatively arranged to transmit said detecting light to a detector; and, said detector operatively arranged to identify said detecting light.

2. The scanning microscope assembly as defined in claim 1, wherein a plurality of light sources are provided for illuminating said object.

3. The scanning microscope assembly as defined in claim 2, wherein said light sources provide light which differs spectrally.

4. The scanning microscope assembly as defined in claim 1, wherein said polarization-rotating device is a $\lambda/2$ plate.

5. The scanning microscope assembly as defined in claim 4, wherein said $\lambda/2$ plate is arranged in a rotatable mount.

6. The scanning microscope assembly as defined in claim 5, wherein said rotatable mount enables a rotation of said $\lambda/2$ plate about an axis of said polarizing glass fibre.

7. The scanning microscope assembly as defined in claim 1, wherein said polarization-rotating device has means for rotating an at least one end of said polarizing glass fibre.

8. The scanning microscope assembly as defined in claim 1, wherein said polarization-rotating device sets a direction of polarization of said illuminating light beam before launching said illuminating light beam into a scanning microscope optic.

* * * * *